July 16, 1963  A. B. EUGA  3,097,726
BRAKE SYSTEM FOR VEHICLES
Original Filed Feb. 8, 1956  3 Sheets-Sheet 1

INVENTOR
Arthur B. Euga
Schmieding and Fultz
Attorney

INVENTOR.
ARTHUR B. EUGA
BY Schmieding and Fultz
ATTORNEYS

July 16, 1963   A. B. EUGA   3,097,726
BRAKE SYSTEM FOR VEHICLES
Original Filed Feb. 8, 1956   3 Sheets-Sheet 3

INVENTOR
Arthur B. Euga
Schmieding and Fultz
Attorney

United States Patent Office 3,097,726
Patented July 16, 1963

3,097,726
BRAKE SYSTEM FOR VEHICLES
Arthur B. Euga, 728½ Franklin Ave., Columbus, Ohio
Original application Feb. 8, 1956, Ser. No. 564,281, now Patent No. 2,940,551, dated June 14, 1960. Divided and this application Apr. 27, 1960, Ser. No. 32,067
4 Claims. (Cl. 188—106)

This invention relates to improvements in braking systems for motor vehicles and more particularly to an auxiliary braking system therefor which is automatically actuable upon failure of the usual service braking means.

This application is a division of my co-pending application Serial No. 564,281 filed February 8, 1956, now Patent No. 2,940,551 granted June 14, 1960, which is a continuation-in-part of Serial No. 176,785 filed July 31, 1950, now abandoned.

Modern motor vehicles are equipped with a fluid actuated service braking system and a so-called parking or emergency braking system. Such a service system, unfortunately, is subject to complete failure upon loss of its operating fluid, as by a broken line or connection in a necessarily closed and sealed system.

One object of the invention, therefore, is the provision of a means for instantly actuating the emergency braking means, upon failure of the service braking means, without any action additional to that required in operating the service braking means.

Yet another object of the invention is the provision of a means for instantly actuating the emergency braking means and instantly supplementing the fluid action of the service braking means, upon partial loss of the serving fluid for the service braking means, without any action additional to that required in operating the service braking means.

Further objects and advantages of the present invention will be apparent from the following description, reference being had to the accompanying drawings wherein preferred forms of embodiments of the invention are clearly shown.

In the drawing:

FIG. 3 should be considered along with FIG. 1, which figures when considered together illustrate a complete system;

Figure 1:
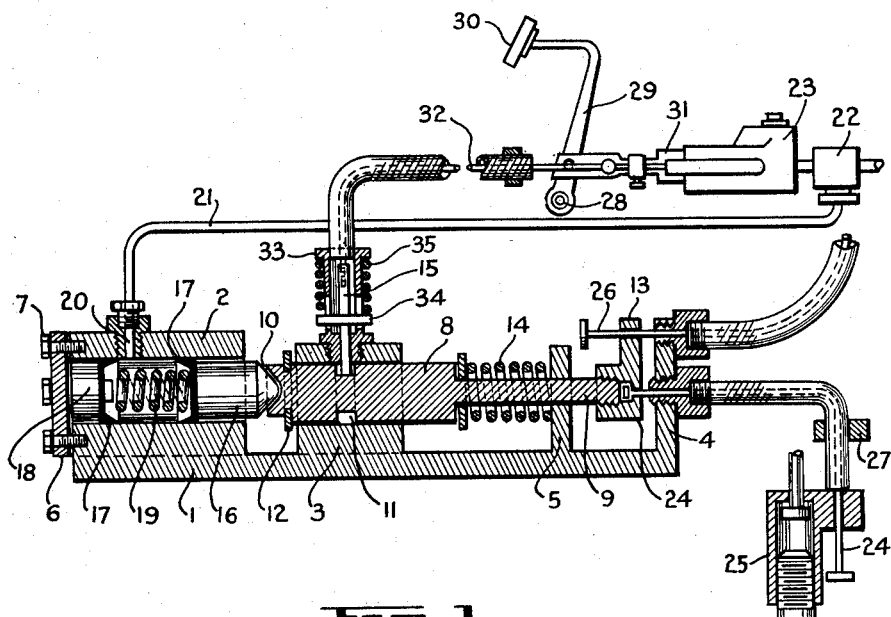
FIG. 1 is an elevation mainly in section and partly diagrammatic of one embodiment of the invention showing an auxiliary braking control means in connection with the service hydraulic braking system and the so-called parking or emergency mechanical braking system.

Referring more in detail to the drawings in which similar reference characters designate corresponding parts throughout the several views and particularly to FIG. 1, the numeral 1 denotes a base plate having a terminal cylinder 2, a medial sleeve bearing 3, a terminal bracket 4 opposite the cylinder 2, and a further bracket 5 intermediate of the bearing 3 and the bracket 4. These members may be formed in a single casting, as shown, or may be an assembly of separate parts secured by any suitable fastening means. The outermost extremity of the cylinder 2 is detachably closed by a cap 6 and securing means 7 which are cap screws. Carried within the bearing 3 is a shaft 8 having a depending portion 9 of smaller section, a concave recess 10 opposite the portion 9, and a peripheral groove 11 intermediate its ends, said shaft 8 being limitedly adapted by a ring 12 and a plate nut 13 to slide to and fro in the bearing 3 in a manner such that the depending portion 9 projects through an aperture in the bracket 5. Disposed about the portion 9 of the shaft 8 between the bracket 5 and the main body portion of the said shaft is a coil spring 14 which normally is held in compression by a latch pin 15 in releasable engagement with the peripheral groove 11 of the shaft 8. Disposed within the cylinder 2 is a slidable piston 16 the external end of which is adapted for alignment with the recess 10 of the shaft 8, like pressure sealing washers 17, a spacing member 18, and a compressed coil spring 19, the latter serving to maintain the piston 16 in contact with the recessed end of the shaft 8.

Detachably connected to the cylinder 2 via a radially disposed passage 20 is a fluid pressure line 21 which extends to and is in communication with the extension fitting 22 of the master hydraulic cylinder 23 which latter may be disposed at any suitable station in the vehicle, but, preferably, is mounted forwardly of the operating control lever therefor.

Figure 4:
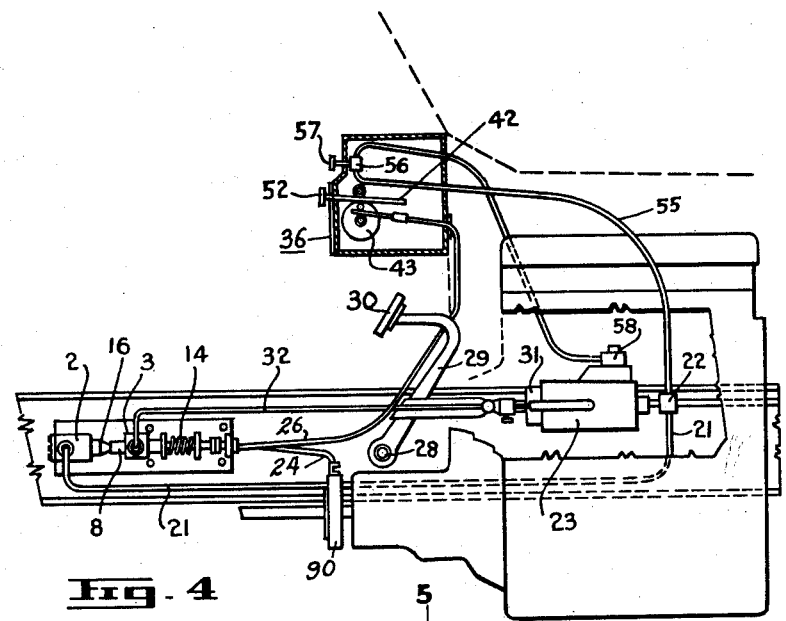
FIG. 4 is a diagrammatic view including the apparatus of FIG. 1.

The depending portion 9 of the shaft 8 is terminally threadably attached by the interiorly threaded plate nut 13 to a control cable 24 which is in loose connection with the usual turnbuckle 25, not fully shown, of the emergency or drive shaft brake 95 of the vehicle. The said portion 9 is further loosely connected by means of the same plate nut 13 to a control cable 26 which extends to a resetting or brake releasing mechanism which preferably is mounted on the inner surface of the dash as shown in FIG. 4. The control cables 24 and 26 are carried in conduits of like character which have each one end detachably fixed to the said bracket 4 and have the opposite ends thereof detachably fastened respectively to the turnbuckle 25 and the said resetting mechanism. Clamping members such as denoted at 27 serve to secure the bodies of the said conduits to any suitable supporting structures which are not illustrated in FIG. 1, all as according to well known construction.

Pivoted at 28 to any supporting structure not shown in the stem 29 of a lever having a pedal termination 30 above the vehicle floor. The stem 29 has a pivotal connection above the pivot 28 with the external end of the piston rod 31 of the master hydraulic cylinder 23. Secured to the piston rod 31 is one end of a control cable 32 having its opposite end threadably attached to one end of the latch pin 15 which is limitedly slidable up and down in a flanged sleeve 33, the latter being detachably secured to the bearing 3. A transversely extending pin 34 in engagement with like diametrically opposite longitudinal slots formed in the periphery of the sleeve 33, is provided to secure the latch pin 15 within the said sleeve, and to limit the travel therein of the said latch pin. A compressed coil spring 35 which is disposed about the sleeve 33 and below the flange thereof, is used to maintain the latch pin 15 in releasable engagement with the peripheral groove 11 of the shaft 8. The control cable 32 is carried in a clamped conduit similar to that heretofore described for the control cables 24 and 26.

Figure 2:
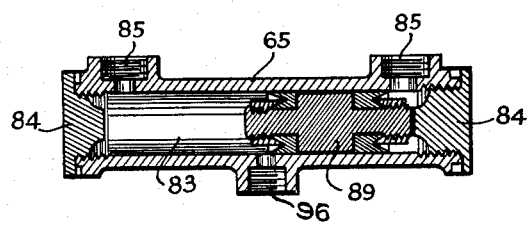
FIG. 2 is a sectional view showing the interior of a transfer sleeve or valve means comprising a portion of the apparatus of the present invention, with the section being taken along a vertical plane through the longitudinal center line of said transfer sleeve or valve means.

While the hydraulic means described is shown in connection with the master cylinder of the hydraulic braking system it may be readily applied to individual wheel brakes through separate lines and transfer sleeves thereby constituting a third brake system. Such a transfer sleeve 65 is illustrated in FIG. 2 of the drawings and constitutes a member having a cylinder 83 formed in the interior thereof which cylinder is closed by end plugs 84. An element 89 is slideably carried in cylinder 83 and may be provided with cup-shaped seals on the ends thereof in the manner illustrated. One end of element 89 is exposed to fluid entering cylinder 83 through one of the intake ports 85 and the other end of element 89 is exposed to fluid entering cylinder 83 through the other of the intake ports of 85. Hence it will be understood that member 89 will be shifted to the right position illustrated when the pressure of fluid entering the transfer sleeve through the left intake port 85 exceeds the fluid pressure entering the cylinder 83 through the right intake port 85. In such right position, illustrated, the left intake port 85 communicates with an outlet port 96. In a like manner, when the fluid pressure on the right side of element 89 exceeds the fluid pressure on the left side of element 89 such element is moved to the left and right intake port 85 is placed in communication with outlet port 96.

Figure 3:
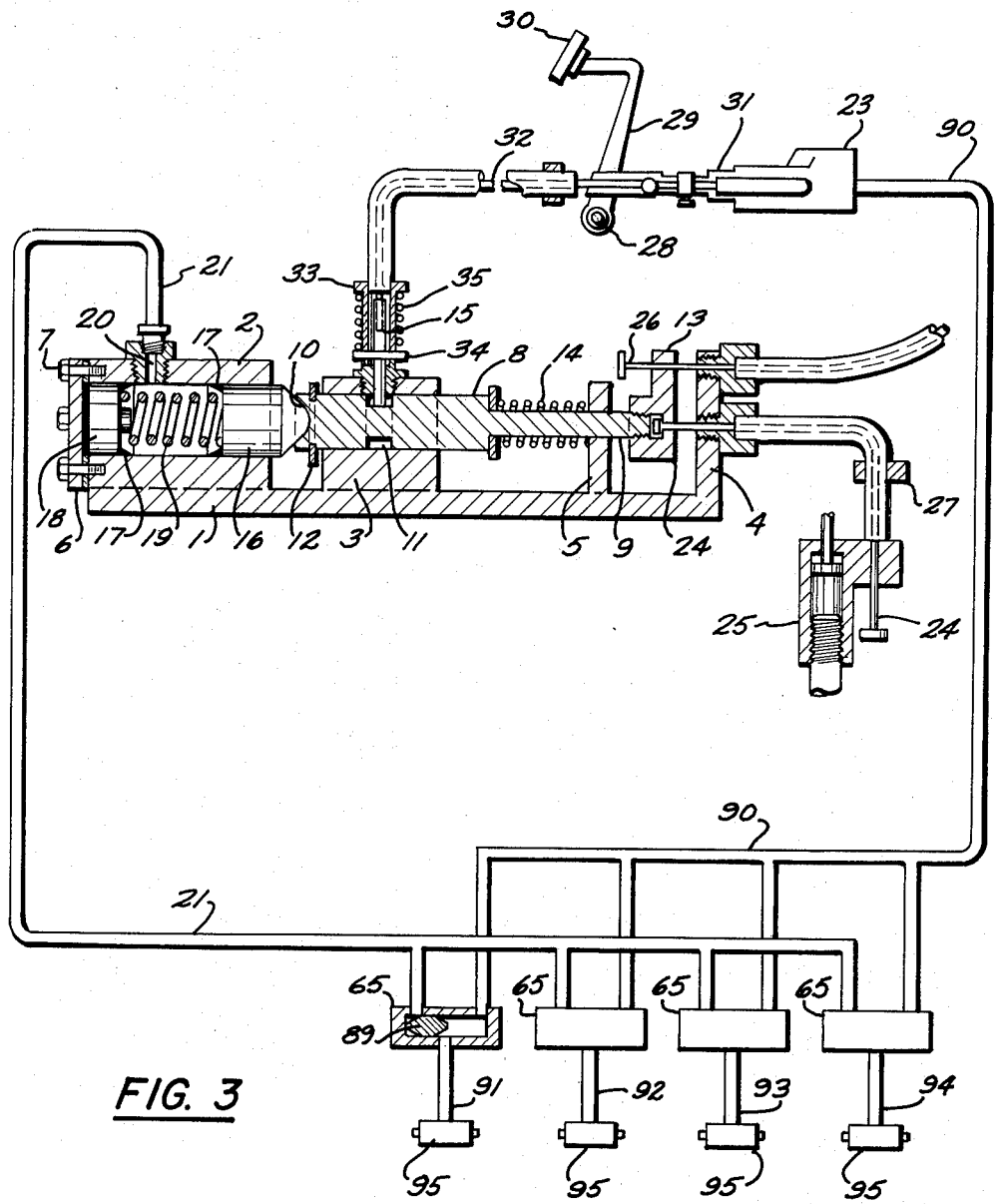
FIG. 3 is a diagrammatic view illustrating a portion of a brake system comprising one aspect of the present invention.

Reference is next made to FIG. 3 which illustrates a modification of the present invention similar to that of FIG. 1 except that the automatic auxiliary hydraulic system is connectable to individual wheel brakes through separate lines and transfer sleeves. As seen in FIG. 3, four brake actuating cylinders 95 are illustrated. Each of said cylinders may be of a conventional type, well known to those skilled in the art, such as the wheel cylinders that are disposed between conventional arcuate brake shoes for expanding same against a brake drum. Each of the brake cylinders 95 communicates with a respective transfer sleeve 65 via a respective line 91—94. Each of the transfer sleeves 65 has one intake port communicating with main cylinder 23, FIG. 1, via line 90. The other intake port of each of the transfer sleeves 65 communicates with the interior of cylinder 2, FIG. 1, via line 21. In operation of the system of FIG. 3, so long as normal fluid pressure exists in main master cylinder 23 and line 90 the shiftable element 89 of transfer sleeve 65 is maintained in the left position, FIG. 3, by fluid pressure such that lines 91, 92, 93, and 94 leading to brake cylinders 95 communicate with line 90. Upon failure, however, of master cylinder 23 or line 90, the drop in fluid pressure in the main hydraulic system will cause the apparatus of FIG. 1 to operate, in the manner previously described, whereby cylinders 2 and line 21 are pressurized. When this occurs shiftable elements 89 of transfer sleeve 65 are moved to the right, from the left position of FIG. 3, by fluid pressure and lines 91, 92, 93, and 94, leading to brake cylinders 95, are placed in fluid communication with line 21 and the brake cylinders 95 are actuated by the auxiliary fluid circuit.

Figure 5:
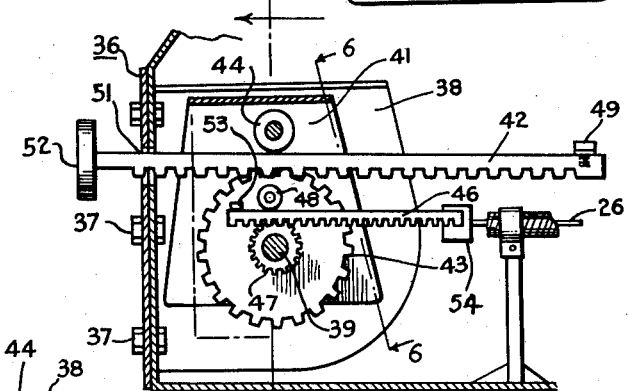
FIG. 5 is an enlarged sectional view of the resetting or brake releasing mechanism.
Figure 6:
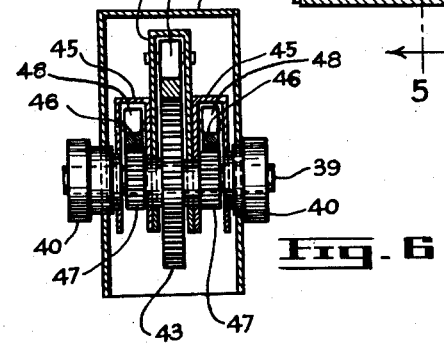
FIG. 6 is a section taken on the line 6—6 of FIG. 5.

Means for resetting the control means are provided and comprises an additional mechanism as shown in FIGS. 4, 5, and 6. 36 designates a bracket which may be secured to the dashboard of a vehicle and to which is rigidly secured, by bolts 37, a channel frame 38. Carried within the frame 38 and rigidly secured thereto by a fixed shaft 39 having terminal hubs 40 is a rack and pinion assembly comprising a U-shaped hanger 41 having an inwardly disposed master rack 42 in engagement with a master pinion 43 and a pivotally mounted guide roller 44, and like U-shaped hangers 45 having like inwardly disposed racks 46 in engagement with like hubbed pinions 47 and like pivotally mounted guide rollers 48, all said pinions being revolvably mounted as one on the shaft 39, said hangers 45 being rigidly secured to the said hanger 41 by any suitable fastening means, e.g. rivets.

One end of the rack 42 is provided with a stop member 49 which may be a screw while the opposite end thereof is extendable through an aperture 51 in the frame 38 and bracket 36 and is terminated above the dash with a detachably secured knob 52.

The like racks 46 are provided with rearward terminal stop members 53 and are detachably secured at the forward extremities thereof to a bar 54 to which is attached the reset control cable 26 heretofore described.

A fluid conveying line 55 having one end threadably attached to the extension fitting 22 of the master hydraulic cylinder 23 is provided with a standard control valve 56 having a shafted knob 57 mounted on the dash structure by bracket 36, and its opposite end is connected to the filler cap opening 58 of the said master cylinder 23.

The embodiment described is automatic in operation and is actuated as hereinafter described without any action additional to that required in operating the hydraulic service or foot pedal braking system.

It is apparent that the latch pin 15 will be withdrawn by a downward and continued movement of the pedal termination 30 of the pivoted stem 29, and the shaft 8 is thereby released. Thus the energy stored in the compressed spring 14 will be imparted through the shaft 8 to the piston 16 tending to force the piston into the cylinder 2. In an adequately served fluid system this force is countered and overcome by the outward displacement force exerted on the inner face of the piston 16 through the master cylinder communicating line 21 and no additional braking action can occur, the latch pin 15 being simply reseated in the groove 11 of the shaft 8 by the spring 35 upon removal of foot pressure from the pedal 30.

If, however, there has been a total loss of fluid action in the hydraulic service braking system as by a leaking connection, or if the system is inadequately served with operating fluid, little or no countering displacement force is exerted on the piston 16 and it is forced within the cylinder 2 by the released energy of the spring 14.

Thus the emergency mechanical braking system may be instantly lockingly applied through the control cable 24 and the fluid action of an inadequately served system supplemented by the sudden inward displacement of the piston 16.

The system may be reset and the brakes released for subsequent actuation by pulling on the knob 52 of the master rack 42 which being effectively coupled to the hubbed pinions 47 and associated racks 46, through the master pinion 43 actuates the control cable 26 thus retracting the shaft 8 until the latch pin 15 is reseated in the groove 11 by the coil spring 35.

The system may be used as a parking brake proof against the depredations of children passengers by neutralizing the hydraulic service braking system through an operation of the dash mounted control valve 56. This is accomplished by manipulating valve handle 57 to open control valve 56 and by depressing pedal lever 29. Fluid is thereby expelled from the pressure cylinder within master cylinder 23, through line 55, and thence into the reservoir of master cylinder 23. Since the pressure cylinder within the master cylinder 23 is not pressurized since control valve 56 is open, cable 32 will pull transversely extending pin 34 from the position of locked engagement with slot 11, FIG. 1, whereby compressed spring 14 will apply tension to cable 24 which in turn will apply the conventional emergency or drive shaft brake 90 of the vehicle. Hence it will be understood that the only way the emergency brake can thereafter be released is by operating the previously described resetting mechanism, or by closing valve 56 and actuating pedal 30 to pressurize master cylinder 23. Plunger 16 will move to the right, FIG. 1, with the result that spring 14 is compressed and the tension released from cable 24 and the drive shaft brake 90 is thereby released.

While the form of embodiments of the present invention as herein disclosed constitute preferred forms, it is to be understood that other forms might be adopted, all coming within the scope of the claims which follow:

I claim:

1. A braking system for a vehicle comprising, in combination, a fluid energy translating means for pressurizing fluid in a service brake system of said vehicle; actuating means for said fluid energy translating means; a fluid motor for applying braking action at a wheel of said vehicle; means forming a chamber in fluid communication with fluid of said service brake system; a member movably disposed in said chamber in communication with the fluid therein; means forming a source of stored energy for applying force to said movable member to move said member in a direction to pressurize said service brake system; means for releasing energy from said source upon failure of said fluid energy translating means to produce normal service brake operating pressure during operation of said actuating means in a direction to apply the service brake; valve means including a first position wherein said motor is connected to said service brake system and a second position wherein said motor is connected to said chamber and isolated from said service brake system and a valve means for venting said service brake fluid system to release service fluid pressure on said moveable member after normal brake application by said actuating means whereby energy from said source of stored energy pressurizes said brake motor with said first mentioned valve means in said second position.

2. A braking system for a vehicle comprising, in combination, a fluid energy translating means for pressurizing fluid in a service brake system of said vehicle; actuating means for said fluid energy translating means; a fluid motor for applying braking action at a wheel of said vehicle; means forming a chamber of fluid in pressure responsive communication with fluid of said service brake system; a member movably disposed in said chamber in communication with the fluid therein; compressed resilient means forming a source of stored energy for applying force to said movable member to move said member in a direction to pressurize said chamber; means for releasing energy from said source upon failure of said fluid energy translating means to produce normal service brake operating pressure during operation of said actuating means in a direction to apply the service brake; a valve means including a first position wherein said motor is connected to said service brake system and a second position wherein said motor is connected to said chamber and isolated from said service brake system; and a manually actuated valve means for venting said service brake fluid system to release service fluid pressure on said movable member after normal brake application by said actuating means whereby energy from said source of stored energy pressurizes said brake motor with said first mentioned valve means in said second position.

3. A brake system for vehicles comprising a brake motor; a service brake fluid system for supplying service fluid to said brake motor; an auxiliary brake fluid system for supplying auxiliary fluid to said brake motor; service fluid energy translating means including a manual operator, actuation of said operator serving to deliver service fluid to said brake motor; means forming a chamber for receiving service fluid from said service brake fluid system; a movable member in said chamber in pressure responsive communication with said service fluid; means forming a source of energy for delivering fluid from said auxiliary brake fluid system to said brake motor responsive to movement of said movable member upon a decrease in pressure in said service brake fluid system during operation of said operator in a direction to apply the service brake; and a manually actuated valve for venting said service brake fluid system to release service fluid pressure on said movable member after normal brake application by said actuating means whereby said auxiliary fluid energy translating means pressurizes said brake motor.

4. A braking system for a vehicle comprising, in combination, a fluid energy translating means for pressurizing fluid in a service brake system of said vehicle; actuating means for said fluid energy translating means; a fluid motor for applying braking action at a wheel of said vehicle; means forming a chamber of fluid in pressure responsive communication with fluid of said service brake system; a member movably disposed in said chamber in communication with the fluid therein; compressed resilient means forming a source of stored energy for applying force to said movable member to move said member in a direction to pressurize said chamber; means for releasing energy from said source upon failure of said fluid energy translating means to produce normal service brake operating pressure during operation of said actuating means in a direction to apply the service brake; valve means including a first position wherein said motor is connected to said service brake system and a second position wherein said motor is connected to said chamber and isolated from said service brake system; and a valve means for venting said service brake fluid system to release service fluid pressure on said movable member after normal brake application by said actuating means whereby energy from said source of stored energy pressurizes said brake motor with said first mentioned valve means in said second position.

References Cited in the file of this patent
UNITED STATES PATENTS
2,940,551     Euga _____ June 14, 1960